(12) United States Patent
Cheerla et al.

(10) Patent No.: US 8,211,250 B1
(45) Date of Patent: Jul. 3, 2012

(54) METHOD OF PROCESSING A BISMUTH BRASS ARTICLE

(75) Inventors: Mahesh K. Cheerla, Howell, MI (US); Robert O. Learmont, Howell, MI (US)

(73) Assignee: BrassCraft Manufacturing Company, Novi, MI (US)

( * ) Notice: Subject to any disclaimer, the term of this patent is extended or adjusted under 35 U.S.C. 154(b) by 0 days.

(21) Appl. No.: 13/218,582

(22) Filed: Aug. 26, 2011

(51) Int. Cl.
C22F 1/00 (2006.01)

(52) U.S. Cl. ..................... 148/684; 420/477

(58) Field of Classification Search .......... 148/684, 148/679, 434, 413; 420/477, 499
See application file for complete search history.

(56) References Cited

U.S. PATENT DOCUMENTS

| | | | | |
|---|---|---|---|---|
| 5,147,469 A * | 9/1992 | Kanzaki et al. | ............... | 148/684 |
| 5,286,444 A | 2/1994 | Tomikawa et al. | | |
| 5,288,458 A | 2/1994 | McDevitt et al. | | |
| 5,409,552 A | 4/1995 | McDevitt et al. | | |
| 5,508,125 A | 4/1996 | Bantz et al. | | |
| 5,565,045 A * | 10/1996 | Caron et al. | ............... | 148/432 |
| 5,637,132 A | 6/1997 | Matthews et al. | | |
| 5,637,160 A * | 6/1997 | Brock et al. | ............... | 148/434 |
| 5,942,056 A | 8/1999 | Singh | | |
| 6,059,901 A | 5/2000 | Sahu | | |
| 6,063,480 A | 5/2000 | Hokazono et al. | | |
| 6,103,188 A | 8/2000 | Guixa Arderiu et al. | | |
| 6,372,061 B1 | 4/2002 | Hatano et al. | | |
| 6,413,330 B1 | 7/2002 | Oishi | | |
| 6,599,378 B1 | 7/2003 | Hagiwara et al. | | |
| 6,645,427 B1 | 11/2003 | Kardokus et al. | | |
| 6,652,675 B2 | 11/2003 | Sakai et al. | | |
| 6,858,102 B1 | 2/2005 | Kardokus et al. | | |
| 6,895,782 B2 * | 5/2005 | Pitbladdo | .......................... | 65/53 |
| 6,949,150 B2 | 9/2005 | Sugawara et al. | | |
| 6,974,509 B2 | 12/2005 | Hagiwara et al. | | |
| 6,990,834 B2 * | 1/2006 | Pitbladdo | ..................... | 65/29.21 |
| 7,056,396 B2 | 6/2006 | Oishi | | |
| 7,190,708 B2 * | 3/2007 | Morton | .......................... | 372/87 |
| 7,261,760 B2 | 8/2007 | Ishida et al. | | |
| 7,287,704 B2 * | 10/2007 | Herslow | ........................ | 235/488 |
| 7,297,215 B2 | 11/2007 | Kurose et al. | | |
| 7,608,157 B2 | 10/2009 | Oishi | | |
| 7,678,173 B2 | 3/2010 | Yokota et al. | | |
| 7,695,578 B2 | 4/2010 | Horigome et al. | | |
| 7,776,163 B2 | 8/2010 | Xu et al. | | |
| 7,806,996 B2 | 10/2010 | Kurose et al. | | |
| 7,819,992 B2 | 10/2010 | Yamamoto et al. | | |
| 7,883,588 B2 | 2/2011 | Yokota et al. | | |
| 7,883,589 B2 | 2/2011 | Oishi | | |
| 7,909,946 B2 | 3/2011 | Oishi | | |
| 2004/0234412 A1 | 11/2004 | Oishi et al. | | |
| 2005/0092401 A1 | 5/2005 | Oishi | | |

* cited by examiner

*Primary Examiner* — Jonathan Johnson
(74) *Attorney, Agent, or Firm* — Carlson, Gaskey & Olds P.C.

(57) ABSTRACT

A method of processing a bismuth brass article includes the steps of machining an extruded brass rod to form an article of a desired shape and annealing the article at an annealing temperature that is no greater than 575° F./302° C. to relieve stress caused by the machining. The extruded brass rod includes a composition, by weight percentage, that includes 58-63 of copper, 0.8-1.5 of bismuth, 0.05-0.15 of phosphorous and a remainder of zinc and any impurities.

15 Claims, 1 Drawing Sheet

```
┌─────────────────────────────┐
│ MACHINE AN EXTRUDED ROD OF  │──42
│ BISMUTH BRASS TO FORM AN    │
│ ARTICLE OF A DESIRED SHAPE  │
└─────────────────────────────┘

┌─────────────────────────────┐
│ ANNEAL THE ARTICLE TO RELIEVE│──44
│   STRESS CAUSED BY THE       │
│        MACHINING             │
└─────────────────────────────┘
```

40

METHOD OF PROCESSING A BISMUTH BRASS ARTICLE

BACKGROUND

This disclosure relates to processing brass alloys and, more particularly, to processing bismuth brass alloys.

Brass alloys are known and used to manufacture articles, such as plumbing fixtures. For example, many brass alloys include lead, which increases the formability of the brass alloy. The lead can be excluded from the alloy and replaced by lead-replacement elements to maintain roughly the same formability, but the exclusion of lead and the inclusion of lead-replacement elements detrimentally change other properties of the alloy and render the alloy unsuitable for the intended end use.

SUMMARY

Disclosed is an example method of processing a bismuth brass article. The method includes machining an extruded brass rod to form an article of a desired shape and annealing the article at an annealing temperature that is no greater than 575° F./302° C. to relieve stress caused by the machining. The extruded brass rod includes a composition, by weight percentage, that includes 58-63 of copper, 0.8-1.5 of bismuth, 0.05-0.15 of phosphorous and a remainder of zinc and any impurities.

In another aspect, the method includes annealing the article at an annealing temperature, T (° F.), for an annealing time, t (minutes), to relieve stress caused by the machining such that a ratio of T/t (annealing temperature divided by annealing time) is no greater than 6.4.

In another aspect, the method includes annealing a plumbing fixture at an annealing temperature of 475-575° F./246-302° C. for an annealing time of no greater than 90 minutes to relieve stress caused by the machining. For the given composition, the annealing temperature and annealing time are selected to limit diffusional movement of bismuth to reduce cracking of the plumbing fixture.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figures 1, 2:
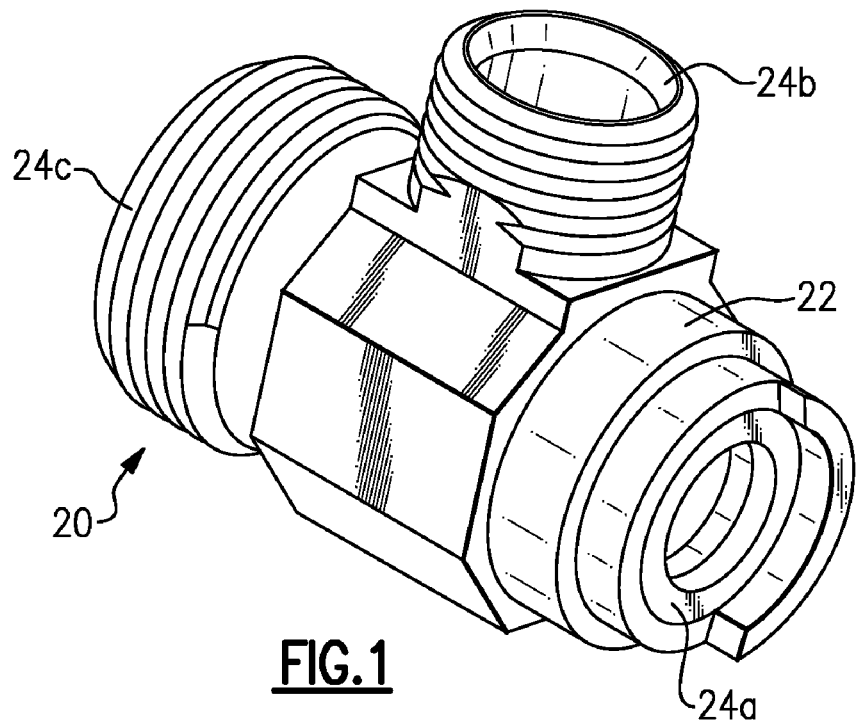
FIG. 1 illustrates an example bismuth brass article.
FIG. 2 shows an example method of processing a bismuth brass article.

FIG. 1 illustrates a schematic perspective view of an example article 20 that is formed from a lead-free, bismuth brass alloy. The exclusion of lead and replacement with bismuth maintain approximately the same formability, or machinability. In general, however, the exclusion of lead and the inclusion of bismuth as a lead-replacement make articles formed from this alloy more susceptible to cracking. As will be described, the disclosed method 40 for processing a bismuth brass article, such as article 20, alleviates the susceptibility to cracking and therefore permits the use of bismuth brass alloys in articles such as plumbing fixtures.

In the example shown, the article 20 is a plumbing fixture that includes a valve body 22, or housing, that contains one or more internal valve components (not shown). In this example, the valve body 22 includes three connection portions, 24a, 24b and 24c. Connection portions 24b and 24c are threaded to receive nuts to secure the valve body 22 to a suitably sized tube.

Connection portion 24a is adapted for connection with an actuator for the internal valve. In one example, the actuator is a handle that can be manually actuated to open or close the internal valve to selectively open or close flow between the connection portions 24b and 24c. It is to be understood that the article 20 is not limited to the example plumbing fixture and that the article 20 may alternatively be another kind of valve, plumbing fixture, or non-plumbing fixture. In some examples, the plumbing fixture is as shown and described in co-pending application Ser. No. 13/218,553, entitled PLUMBING FIXTURE MADE OF BISMUTH BRASS ALLOY).

As indicated above, the article 20 is fabricated from a bismuth brass alloy. The bismuth brass alloy has a composition that includes, by weight percentage, 58-63 of copper, 0.8-1.5 of bismuth, 0.05-0.15 of phosphorous, and a remainder of zinc and any impurities. In a further example, the impurities include, by weight percentage, up to 0.001 of cadmium, up to 0.5 of iron, up to 0.09 of lead, up to 0.1 of silicon, up to 0.5 of tin, and up to 0.5 of any other impurity elements. In a further example, the compositions above include, by weight percentage, 0.8-1.45 of the bismuth. In another example, the compositions above include, by weight percentage, 0.8-1.2 of the bismuth.

Although the bismuth increases machinability of the given bismuth brass alloy compositions, it also increases the susceptibility of the article 20 to cracking. Thus, the given amount of bismuth in the composition is selected to increase machinability and, in combination with the method 40 later described herein, alleviate susceptibility to cracking.

A portion of the bismuth typically resides at the grain boundaries in the microstructure of the alloy and can, therefore, function as a stress concentrator for the initiation of cracking. Another portion of the bismuth resides in solution in the alloy. However, if bismuth diffuses or is lost from the composition during the processing of the article 20, the machinability and ductility of the alloy decreases and the alloy becomes susceptible to cracking. Thus, as will be described below, the processing of the bismuth brass alloy to form the article 20 is carefully controlled to limit diffusional movement of bismuth to maintain the ductility and reduce susceptibility to cracking.

FIG. 2 illustrates an example method 40 of processing a bismuth brass article, such as article 20 described above. The method generally includes steps 42 and 44, although it is to be understood that the steps 42 and 44 can include sub-steps or additional steps in the processing to form the article.

As shown, step 42 includes the action of machining an extruded rod to form the article into a desired shape. The extruded brass rod has a composition by weight percentage of 58-63 of copper, 0.8-1.5 of bismuth, 0.05-0.15 of phosphorous and a remainder of zinc and any impurities.

In embodiments, the machining of the extruded brass rod includes cutting the rod to form the rod into a desired shape. For instance, for the article 20 described above, the rod is cut to form the general shape of the valve body 22 and connections 24a-c. The machining of the extruded brass rod results in residual stresses in the article 20 that are then relieved through at step 44 of the method 40.

At step 44, the article is annealed to relieve the residual stresses caused by the machining. The annealing of step 44 is a heat treatment for the purpose of stress relief rather than microstructure refinement. In one embodiment, the annealing is conducted at an annealing temperature that is no greater than 575° F./302° C. The susceptibility of the given bismuth brass composition to cracking can occur from bismuth located at grain boundaries of the microstructure. The given annealing temperature is selected to reduce diffusional movement of additional bismuth from solution to the grain boundaries and the surface of the article, reduce growth of bismuth-containing phases at the grain boundaries and/or reduce volatile loss of the bismuth that would otherwise reduce machinability and ductility of the alloy.

In a further example, the annealing temperature is 475-575° F./246-302° C. and the annealing is conducted for an annealing time of no greater than 90 minutes. In a further embodiment, the annealing temperature is 525-575° F./274-302° C. for an annealing time of no more than 90 minutes. The annealing temperature and annealing time are selected to limit diffusional movement or loss of bismuth to the surface of the article during the annealing step 44. In one example, the resulting, final article has an approximately uniform bismuth distribution between the surface and the bulk interior (e.g., does not have a bismuth-rich surface region).

In another embodiment, the annealing temperature, T (° F.), and the annealing time, t (minutes), are selected such that a ratio of T/t (annealing temperature divided by annealing time) is no greater than 6.4. In this example, selecting the ratio to be no greater than 6.4 for the given composition of bismuth brass alloy limits diffusion of the bismuth from solution to the grain boundaries, reduces growth of bismuth-containing phases at the grain boundaries and/or reduces loss the of bismuth to the surface. In a further example, the ratio is selected to be 5.2-6.4 to limit diffusion of the bismuth from solution to the grain boundaries and to the surface of the article, reduce growth of bismuth-containing phases at the grain boundaries and/or reduce loss the of bismuth to the surface of the article.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of processing a bismuth brass article, the method comprising:
   machining an extruded brass rod to form an article of a desired shape, the extruded brass rod including a composition by weight percentage:
   58-63 of copper,
   0.8-1.5 of bismuth,
   0.05-0.15 of phosphorous, and
   a remainder of zinc and any impurities; and
   annealing the article at an annealing temperature no greater than 575° F./302° C. to relieve stress caused by the machining.

2. The method as recited in claim 1, including selecting the annealing temperature and an annealing time at the annealing temperature to limit diffusional movement of bismuth to the surface.

3. The method as recited in claim 1, including annealing at the annealing temperature of 475-575° F./246-302° C. for an annealing time that is no greater than 90 minutes.

4. The method as recited in claim 3, wherein the annealing temperature is 525-575° F.

5. The method as recited in claim 3, wherein the article is a plumbing fixture, and including selecting the annealing temperature and an annealing time to limit diffusional movement of bismuth to reduce cracking of the plumbing fixture.

6. The method as recited in claim 1, including annealing the article at the annealing temperature, T (° F.), for an annealing time, t (minutes), of no greater than 90 minutes such that a ratio T/t (annealing temperature divided by annealing time) is no greater than 6.4.

7. The method as recited in claim 6, wherein the ratio is 5.2-6.4.

8. A method of processing a bismuth brass article, the method comprising:
   machining an extruded brass rod to form an article of a desired shape, the extruded brass rod including a composition by weight percentage:
   58-63 of copper,
   0.8-1.5 of bismuth,
   0.05-0.15 of phosphorous, and
   a remainder of zinc and any impurities; and
   annealing the article at an annealing temperature, T (° F.), for an annealing time, t (minutes), to relieve stress caused by the machining such that a ratio of T/t (annealing temperature divided by annealing time) is no greater than 6.4.

9. The method as recited in claim 8, including selecting the annealing temperature and the annealing time at the annealing temperature to avoid diffusional movement of bismuth to the surface of the article.

10. The method as recited in claim 8, wherein the annealing temperature is 475-475° F./246-302° C., the annealing time is no greater than 90 minutes and the ratio is no less than 5.2.

11. The method as recited in claim 10, wherein the article is a plumbing fixture, and including selecting the annealing temperature and the annealing time to limit diffusional movement of bismuth to reduce cracking of the plumbing fixture.

12. A method of processing a bismuth brass article, the method comprising:
   machining an extruded brass rod to form a plumbing fixture of a desired shape, the extruded brass rod including a composition by weight percentage:
   58-63 of copper,
   0.8-1.5 of bismuth,
   0.05-0.15 of phosphorous, and
   a remainder of zinc and any impurities; and
   annealing the plumbing fixture at an annealing temperature of 475-575° F./246-302° C. for an annealing time of no greater than 90 minutes to relieve stress caused by the machining, wherein, for the given composition, the annealing temperature and annealing time are selected to limit diffusional movement of bismuth to reduce cracking of the plumbing fixture.

13. The method as recited in claim 12, including selecting the annealing temperature and the annealing time at the annealing temperature to avoid loss of bismuth from the composition such that the plumbing fixture has, by weight percentage, 0.8-1.5 of bismuth.

14. The method as recited in claim 12, including annealing the article at the annealing temperature, T (° F.), for an annealing time, t (minutes), of no greater than 90 minutes such that a ratio T/t (annealing temperature divided by annealing time) is no greater than 6.4.

15. The method as recited in claim 14, wherein the ratio is 5.2-6.4.

* * * * *